United States Patent
Kosaka (10) Patent No.: US 9,906,705 B2
(45) Date of Patent: Feb. 27, 2018

(54) IMAGE PICKUP APPARATUS

(71) Applicant: CANON KABUSHIKI KAISHA, Tokyo (JP)

(72) Inventor: Yuichi Kosaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/524,538

(22) Filed: Oct. 27, 2014

(65) Prior Publication Data
US 2015/0116500 A1    Apr. 30, 2015

(30) Foreign Application Priority Data

Oct. 30, 2013 (JP) ................................ 2013-224949

(51) Int. Cl.
*H04N 5/232*    (2006.01)
*H04N 5/33*    (2006.01)

(52) U.S. Cl.
CPC ......... *H04N 5/23212* (2013.01); *H04N 5/332* (2013.01)

(58) Field of Classification Search
CPC ................................................. H04N 5/23212
See application file for complete search history.

(56) References Cited

U.S. PATENT DOCUMENTS 4,982,219 A * 1/1991 Uchiyama ................ G02B 7/34
                                                                 396/91
2006/0066957 A1    3/2006 Fukui
(Continued)

FOREIGN PATENT DOCUMENTS

JP    2003324751 A    11/2003
JP    2006-098771 A    4/2006
(Continued)

OTHER PUBLICATIONS

Office Action issued in Japanese Patent Application No. 2013-224949 mailed May 23, 2017.

*Primary Examiner* — David Porta
*Assistant Examiner* — Hugh M Maupin
(74) *Attorney, Agent, or Firm* — Rossi, Kimms & McDowell LLP (57) ABSTRACT

The image pickup apparatus includes a focus detector to produce, by using a light from an object passing through an image-taking optical system, focus information indicating a focus state of the image-taking optical system, a light-receiving sensor including visible-light receiving elements each receiving the light from the object and respectively having sensitivity centroids in mutually different wavelength ranges of a visible wavelength range, and a controller. The light-receiving sensor includes, separately from the visible-light receiving elements, infrared receiving elements each having a sensitivity centroid in an infrared wavelength range. An infrared-cutting filter disposed on a light-entering side further than the light-receiving sensor has a half-value wavelength longer than a wavelength of the sensitivity centroid of the infrared receiving elements. The controller performs focus control by using the focus information, output from the visible-light receiving elements and output from the infrared receiving elements.

12 Claims, 5 Drawing Sheets

(56) References Cited

U.S. PATENT DOCUMENTS

| | | | |
|---|---|---|---|
| 2009/0009621 A1* | 1/2009 | Yamaguchi | H04N 5/33 348/222.1 |
| 2009/0032678 A1* | 2/2009 | Taniguchi | 250/201.2 |
| 2009/0185185 A1* | 7/2009 | Shakespeare | G01J 3/36 356/406 |
| 2011/0134293 A1* | 6/2011 | Tanaka | 348/280 |
| 2014/0160278 A1* | 6/2014 | Benson et al. | 348/135 |

FOREIGN PATENT DOCUMENTS

| | | |
|---|---|---|
| JP | 2007132967 A | 5/2007 |
| JP | 2011053377 A | 3/2011 |
| JP | 2011149901 A | 8/2011 |
| JP | 2011151596 A | 8/2011 |
| JP | 2012-168429 A | 9/2012 |

\* cited by examiner

FIG. 8

IMAGE PICKUP APPARATUS

BACKGROUND OF THE INVENTION

Field of the Invention

The present invention relates to an image pickup apparatus which performs focus control of an image-taking optical system by using spectral information of a light from an object.

Description of the Related Art

Image pickup apparatuses such as single-lens reflex digital cameras perform focus control which detects a focus state (defocus amount) of an image-taking optical system of an interchangeable lens and moves a focus lens in the image-taking optical system by a movement amount calculated on a basis of the detected focus state to acquire an in-focus state. Many of such image pickup apparatuses introduce part of a light from an object passing through the image-taking optical system to a focus detector to perform detection of the focus state (hereinafter referred to as "focus detection"); the focus detector is provided separately from an image sensor which captures an image of the object. In these image pickup systems, the focus detector performs the focus detection, with consideration of chromatic aberration generated in the image-taking optical system, by using a specific color light and calculates the movement amount of the focus lens on the basis of the detected focus state (focus detection result). However, since a spectral sensitivity of the focus detector and that of the image sensor are different from each other, the movement amount of the focus lens calculated on the basis of the focus detection result obtained by the focus detector is not necessarily a movement amount by which a best in-focus object image can be obtained at the image sensor.

For instance, description will be made of a case, when a focal point in a red light and that in a blue light are different from each other due to the chromatic aberration generated in the image-taking optical system, the focus detector has a sensitivity to the red light as the specific color light and, on the other hand, the image sensor has an even sensitivity to the red light, a green light and the blue light. In this case, the focus detector performs the focus detection for the red light and calculates the movement amount of the focus lens by which the best in-focus image can be obtained, but a movement of the focus lens only by this movement amount is highly likely to provide blurs of the green and blue lights on the image sensor. Since visual perception of humans has a strong spectral-sensitivity characteristic, especially with respect to a green color, presence of the green light blur provides an entirely blurred image.

Japanese Patent Laid-Open No. 2006-098771 discloses an image pickup apparatus in which a first sensor having a spectral sensitivity to a visible wavelength range and a second sensor having a spectral sensitivity to an infrared wavelength range separately receive a reflected light from an object and which corrects, by using outputs from the first and second sensors, a focus detection result from a focus detector.

Similarly, Japanese Patent Laid-Open No. 2012-168429 discloses an image pickup apparatus provided with a single sensor that includes a light-receiving element (infrared receiving element) having a spectral sensitivity to an infrared wavelength range and two light-receiving elements (visible-light receiving elements) having spectral sensitivities to visible wavelength ranges different from each other. This image pickup apparatus determines a light source which illuminates an object by using output of the infrared receiving elements and output of one of the two visible-light receiving elements and further determines a color of the object by using the outputs of the two visible-light receiving elements. This image pickup apparatus corrects a focus detection result obtained by a focus detector, on a basis of the determination results.

However, the image pickup apparatus disclosed in Japanese Patent Laid-Open No. 2006-098771 does not measure a spectral intensity ratio in a visible light contained in the reflected light from the object, namely, the color of the object. For this reason, the image pickup apparatus cannot correct the focus detection result depending on the color of the object.

On the other hand, the image pickup apparatus disclosed in Japanese Patent Laid-Open No. 2012-168429 can determine, by using the single sensor that includes the infrared receiving element and the two visible-light receiving elements, both a type of the light source and the color of the object. However, the sensor only includes the single infrared receiving element and the two visible-light receiving elements, which makes it impossible to individually detect, for various objects included in an image-taking area, the type of the light source and the color of the object. Therefore, it is desirable to provide in a single sensor a large number of the infrared receiving elements and a large number of the visible-light receiving elements.

However, arranging in the single sensor such large numbers of the infrared receiving elements and the visible-light receiving elements causes the following problems. In order to prevent accuracy in the determinations of the type of the light source and the color of the object from being decreased due to appearance of a sensitivity to the infrared wavelength range in the visible-light receiving elements (in particular, light receiving elements for blue and green), it is necessary to provide, at a light-entering side further than the sensor, an infrared-cutting filter. In the case of providing the infrared-cutting filter, if the number of the infrared receiving elements and that of the visible-light receiving elements are large and a size of each of these elements is thus small, it is difficult to provide the infrared-cutting filter only to, among all the visible-light receiving elements, the light receiving elements for blue and green. On the other hand, if a large part of an infrared light is shielded by the infrared-cutting filter such that the infrared light is prevented from entering the infrared receiving elements, a sufficient output cannot be acquired from the infrared receiving elements, which makes it impossible to determine the type of the light source.

SUMMARY OF THE INVENTION

The present invention provides an image pickup apparatus in which multiple infrared receiving elements and multiple visible-light receiving elements are provided in a single sensor and which is capable of detecting both a type of a light source and a color of an object included in an image-taking area with good accuracy and is thereby capable of performing satisfactory focus control depending on detection results of the type of the light source and the color of the object.

The present invention provides as an aspect thereof an image pickup apparatus including a focus detector configured to produce, by using a light from an object passing through an image-taking optical system, focus information indicating a focus state of the image-taking optical system, a light-receiving sensor including multiple visible-light receiving elements each receiving the light from the object and respectively having sensitivity centroids in mutually different wavelength ranges of a visible wavelength range, and a controller configured to perform focus control of the image-taking optical system. The light-receiving sensor includes, separately from the visible-light receiving elements, multiple infrared receiving elements each having a sensitivity centroid in an infrared wavelength range, an infrared-cutting filter is disposed on a light-entering side further than the light-receiving sensor, the infrared-cutting filter having a half-value wavelength longer than a wavelength of the sensitivity centroid of the infrared receiving elements, and the controller is configured to perform the focus control by using the focus information, output from the visible-light receiving elements and output from the infrared receiving elements.

Other aspects of the present invention will become apparent from the following description and the attached drawings.

DESCRIPTION OF THE EMBODIMENTS

Exemplary embodiments of the present invention will be described below with reference to the attached drawings.

Figure 1:
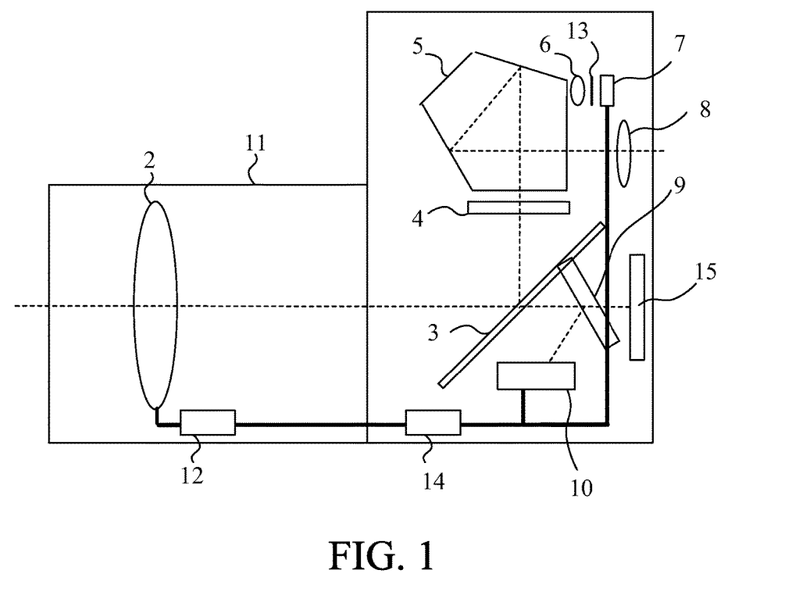
FIG. 1 is a diagram illustrating a configuration of an image pickup apparatus that is an embodiment of the present invention.

FIG. 1 illustrates a configuration of an image pickup apparatus 1 that is an embodiment of the present invention. The image pickup apparatus 1 is a single-lens reflex digital camera to which an interchangeable lens 11 housing an image-taking optical system 2 is detachably attached. A camera controller (camera CPU) 14 provided to the image pickup apparatus 1 as a controller and a lens controller (lens CPU) 12 provided inside the interchangeable lens 11 can communicate with each other. Although this embodiment will describe a lens-interchangeable image pickup apparatus, lens-integrated image pickup apparatuses are also included in other embodiments of the present invention.

The image-taking optical system 2 includes at least a focus lens (not illustrated). The focus lens is movable in an optical axis direction. For drive of the focus lens, a focus actuator (not illustrated) such as a motor is provided to the interchangeable lens 11.

An object (not illustrated) illuminated with a light from a light source (not illustrated) reflects the light therefrom according to a reflection characteristic of its surface. The light reflected by the object passes through the image-taking optical system 2 and then enters the image pickup apparatus 1 to form an object image on an image sensor 15.

Between the image-taking optical system 2 and the image sensor 15, a main mirror 3 is disposed which is rotatable to a down position located in an optical path of the light from the image-taking optical system and an up position retracting outside the optical path. In a state in which the main mirror 3 is located at the down position, part of the light from the image-taking optical system 2 is reflected by the main mirror 3, forms an object image on a focus screen 4 and then reaches a user's eye (not illustrated) via a penta prism 5 and an eye piece 6. This finder optical system allows the user to observe the object image (that is, the objet located within an image-taking area) formed on the focus screen 4.

Part of the light introduced to the penta prism 5 reaches a photometric sensor (light-receiving sensor) 7 via a photometric optical system 6. At a light-entering side further than the photometric sensor (that is, between the photometric optical system 6 and the photometric sensor 7), an infrared-cutting filter 13 is disposed.

Figure 2A:
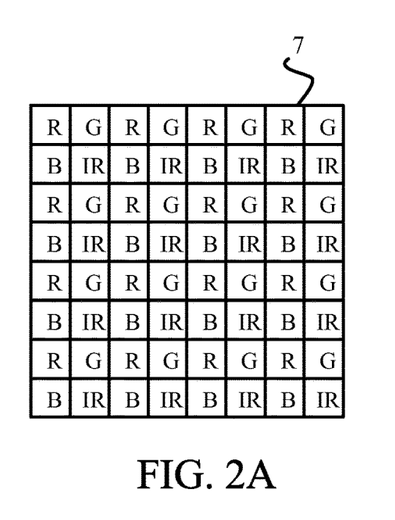
FIGS. 2A and 2B are diagrams illustrating a photometric sensor of the image pickup apparatus.
Figure 2B:
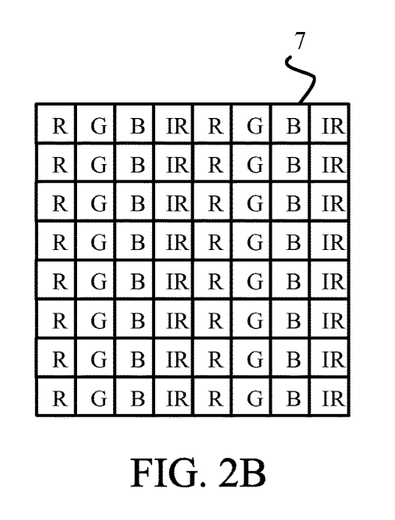

FIGS. 2A and 2B illustrate arrangement examples of light-receiving elements provided on a light-receiving surface of the photometric sensor 7. The photometric sensor 7 includes multiple visible-light receiving elements (hereinafter referred to also as "visible-light pixels") R, G and B having sensitivity centroids in mutually different wavelength ranges in a visible light wavelength range and multiple infrared receiving elements IR (hereinafter referred to as "IR pixels") having a sensitivity centroid in an infrared wavelength range. The multiple visible-light receiving elements include multiple red pixels (hereinafter referred to as "R pixels") whose sensitivity centroid is in a red wavelength range, multiple green pixels (hereinafter referred to as "G pixels") whose sensitivity centroid is in a green wavelength range and multiple blue pixels (hereinafter referred to as "B pixels") whose sensitivity centroid is in a blue wavelength range.

In the arrangement example of FIG. 2A, pixel groups each constituted by four pixels including the R pixel, the G pixel, the B pixel and the IR pixel which are arranged in a two-by-two matrix are repeatedly arranged in horizontal and vertical directions.

Similarly, in the arrangement example of FIG. 2B, the R pixels, the G pixels, the B pixels and the IR pixels respectively form pixel rows each extending in the vertical direction, and the R pixel row, the G pixel row, the B pixel row and the IR pixel row are repeatedly arranged in the horizontal direction in this order.

With respect to the photometric sensor 7 in which a large number of the visible-light pixels R, G and B and IR pixels are thus arranged, the infrared-cutting filter 13 is disposed so as to cover the entire light-receiving surface of the photometric sensor 7. However, an infrared-cutting filter whose half-value wavelength (i.e., a wavelength at which its transmittance is 50%) is in a range of 620 to 680 nm, such as one commonly used in digital cameras, shields more than a half of an entering infrared light, so that use thereof makes it impossible for the IR pixels to sufficiently detect the infrared light. For this reason, this embodiment uses an infrared (IR)-cutting filter 13 whose half-value wavelength is in a wavelength range higher than 680 nm. A detailed description of the half-value wavelength of the IR-cutting filter 13 and the sensitivity centroid of each pixel of the photometric sensor 7 will be made later.

The photometric sensor 7 measures, by using output of the G pixels, a luminance of the light from the object located in the image-taking area and produces object luminance information to output it. In addition, the photometric sensor 7 measures, by using output of the R pixels, the output of the G pixels and output of the B pixels, a spectral intensity ratio of the light from the object and produces spectral information indicating an object color to output it. Furthermore, the photometric sensor 7 produces, by using the output of at least one of the R, G and B pixels (for example, the B pixels) and output of the IR pixels, light source information indicating type of the light source which illuminates the object to output the light source information.

Between the main mirror 3 and the image sensor 15, a sub mirror 9 is disposed. The sub mirror reflects the light transmitted through the main mirror 3 so as to introduce the transmitted light to a focus detector 10.

The focus detector 10 divides the light from the sub mirror 9 (i.e., part of the light passing through the image-taking optical system 2) into two lights and causes the two lights to form two object images (hereinafter referred to as "two images"). The two images are photoelectrically converted by two light-receiving-element rows (line sensors) provided inside the focus detector 10, and thereby two image signals are provided. Furthermore, the focus detector 10 performs a correlation calculation for the two image signals to calculate a phase difference which is a shift amount of the two image signals. Thereafter, the focus detector 10 calculates (detects), on a basis of the phase difference, a defocus amount which is information (focus information) indicating a focus state of the image-taking optical system 2 and outputs the defocus amount to the camera controller 14. Such a method for detecting the defocus amount performed by the focus detector 10 is known as a phase difference detection method.

The camera controller 14 corrects the defocus amount calculated by the focus detector 10 by using the light source information and the object color information output from the photometric sensor 7 to calculate a corrected defocus amount. Such a process for calculating the corrected defocus amount is referred to as "defocus amount correction". Thereafter, the camera controller 14 calculates, from the corrected defocus amount, the movement amount of the focus lens to a position (in-focus position) at which the image-taking optical system 2 comes into an in-focus state and sends information on the movement amount to the lens controller 12.

The lens controller 12 drives the focus actuator such that the focus actuator moves the focus lens by the movement amount sent from the camera controller 14. Thereby, autofocus (AF) as focus control is performed. Photometry (production of the object luminance information, the light source information and the object color information) and the AF are performed in response to a first stroke operation (half-press operation) of a release switch provided in the image pickup apparatus 1.

Thereafter, in response to a second stroke operation (full-press operation) of the release switch, the camera controller 14 causes the image sensor 15 to start exposure for image taking (for image recording). The image sensor 15, which is constituted by a photoelectric conversion element such as a CCD sensor or a CMOS sensor, photoelectrically converts the object image. An image processor (not illustrated) coverts an electrical signal output from the image sensor 15 into a digital signal and then performs various image processes on the digital signal to produce an image signal (image data). The image signal is displayed on a back display provided in the image pickup apparatus 1 and recorded to a recording medium such as a semiconductor memory.

Figure 3:
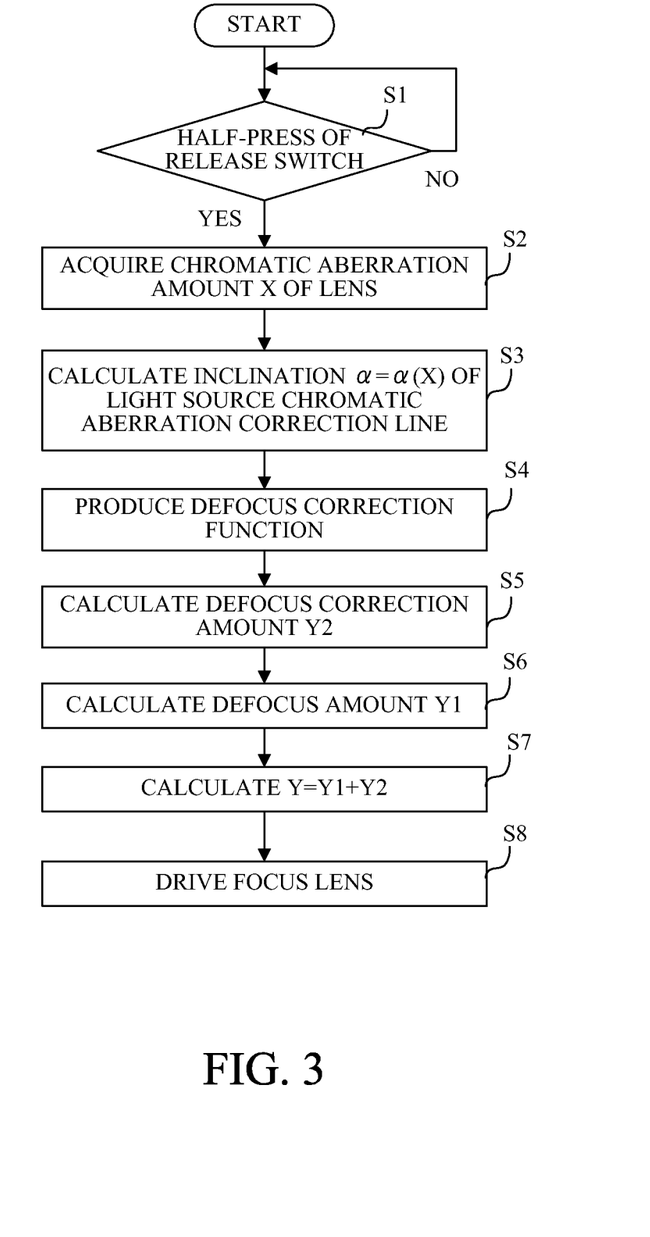
FIG. 3 is a flowchart illustrating an AF operation in the image pickup apparatus.

Next, an operation for the AF which is performed by the camera controller 14 will be described with reference to a flowchart of FIG. 3. This AF operation is performed by the camera controller 14 according to a computer program.

At step (abbreviated as S in the drawing) 1, upon detection of the half-press operation of the release switch, the camera controller 14 proceeds to step 2. At step 2, the camera controller 14 acquires information indicating a chromatic aberration amount X of the image-taking optical system 2 as chromatic aberration information. The chromatic aberration information may be pre-stored in a memory provided in the image pickup apparatus 1 or may be acquired from the interchangeable lens 11 (lens controller 12) through communication therewith.

Next, at step 3, the camera controller 14 calculates, by using the chromatic aberration amount X acquired at step 2, an inclination of a light source correction line. The chromatic aberration information on the chromatic aberration amount X contains a chromatic aberration amount generated when the object is illuminated with a first light containing a large amount of infrared light and a chromatic aberration amount generated when the object is illuminated with a second light containing a smaller amount of the infrared light than that in the first light.

An expression $\gamma=F(R,G,B,IR)$ is herein defined as a function representing the output from the photometric sensor 7. The term $F(R,G,B,IR)$ is a value determined by the output of the R, G, B and IR pixels and is adjusted into a function corresponding to any chromatic aberration amount X. First, as illustrated in FIG. 4, a straight line is drawn between two points A and B whose coordinates are an output $\gamma$ from the photometric sensor 7 and a defocus correction amount (i.e., chromatic aberration amount X) corresponding to the output $\gamma$.

Figure 4:
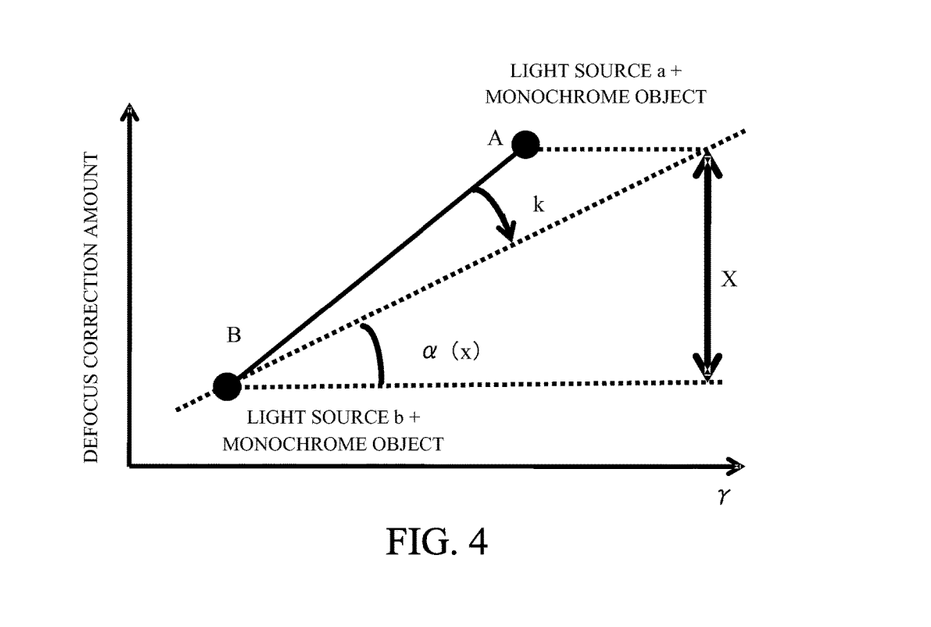
FIG. 4 is a diagram illustrating a defocus correction amount corresponding to a light source and a color of an object, calculated in the image pickup apparatus.

The coordinates of the point B in FIG. 4 represents, for example, a defocus correction amount corresponding to when a monochrome object is illuminated with a light from a light source (hereinafter referred to as "a reference light source") b which brings the output $\gamma$ from the photometric sensor to L. Similarly, the coordinates of the point A represents, for example, a defocus correction amount corresponding to when the monochrome object is illuminated with a light from a light source a which brings the output $\gamma$ from the photometric sensor 7 to a value other than L. Next, a multiplication of an inclination of this straight line by a predetermined coefficient k is made to calculate an inclination $\alpha(X)$ of the light source correction line. The coefficient k is adjusted so as to provide the inclination of the light source correction line with best accuracy for various values of the output $\gamma$ from the photometric sensor 7. At least one of a constant multiplication and a constant exponentiation may be performed on the chromatic aberration amount X.

Next, at step 4, the camera controller 14 produces $f(\gamma)=\alpha(X)\times(\gamma-L)$ as a defocus correction function. Symbol L represents a constant and is decided such that a value of $f(\gamma)$ becomes 0 when the object is illuminated with the light from the reference light source a. That is, L is equal to $\gamma$ obtained when the object is illuminated with the light from the reference light source a.

Next, at step 5, the camera controller 14 substitutes the output $\gamma$ of the photometric sensor 7 into $\gamma$ of the defocus correction function $f(\gamma)$ calculated at step 4 to calculate a defocus correction amount Y2.

Next, at step 6, the camera controller 14 calculates a defocus amount Y1 on the basis of the phase difference between the outputs (two image signals) from the line sensors of the focus detector 10.

Next, at step 7, the camera controller 14 calculates a corrected defocus amount (corrected focus information) Y as a final defocus amount by Y=Y1+Y2. That is, the camera controller 14 calculates the corrected defocus amount Y by using the defocus amount (focus information) Y1 and the defocus correction amount Y2 corresponding to the light source information and the object color information acquired by the photometric sensor 7.

Thereafter, at step 8, the camera controller 14 sends an instruction to the lens controller 12 so as to cause the lens controller 12 to move the focus lens by a movement amount corresponding to the corrected defocus amount Y. The lens controller 12 controls the focus actuator such that the focus actuator moves the focus lens by the movement amount contained in the instruction. The focus lens is thereby moved to an in-focus position, and thus the image-taking optical system 2 comes into an in-focus state with respect to the object.

As described above, the image pickup apparatus 1 according to this embodiment can perform appropriate correction corresponding to the type of the light source which illuminates the object and to the color of the object on the defocus amount which is the focus information obtained by the phase difference detection method in the focus detector 10. Therefore, the image pickup apparatus can perform satisfactory AF (focus control) irrespective of the type of the light source and the color of the object.

Figure 5:
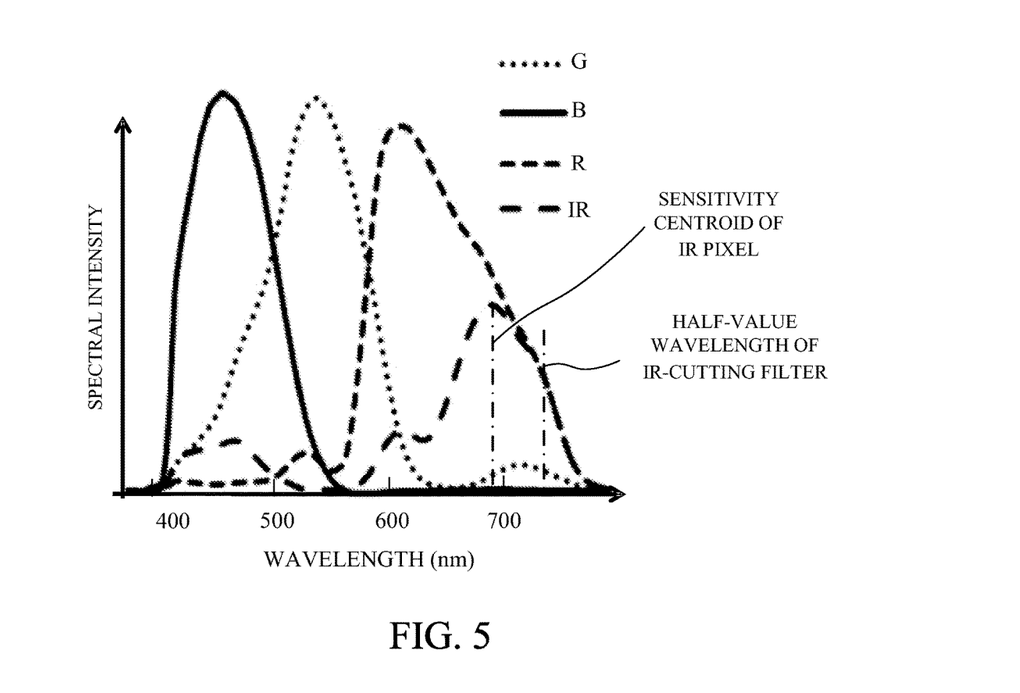
FIG. 5 is a diagram illustrating a spectral sensitivity characteristic of the photometric sensor.

A detailed description of the sensitivity centroids of the photometric sensor 7 and the half-value wavelength of the IR-cutting filter 13 will be made. FIG. 5 illustrates a spectral sensitivity characteristic of the photometric sensor 7. As described above, the B pixel has its sensitivity centroid around 470 nm in the blue wavelength range, the G pixel has its sensitivity centroid around 530 nm in the green wavelength range, and the R pixel has its sensitivity centroid around 600 nm in the red wavelength range. The IR pixel has its sensitivity centroid around 690 nm slightly shorter than 700 nm. The half-value wavelength of the IR-cutting filter 13 is set to around 720 nm longer than the sensitivity centroid of the IR pixel (furthermore, longer than 700 nm).

Figure 8:
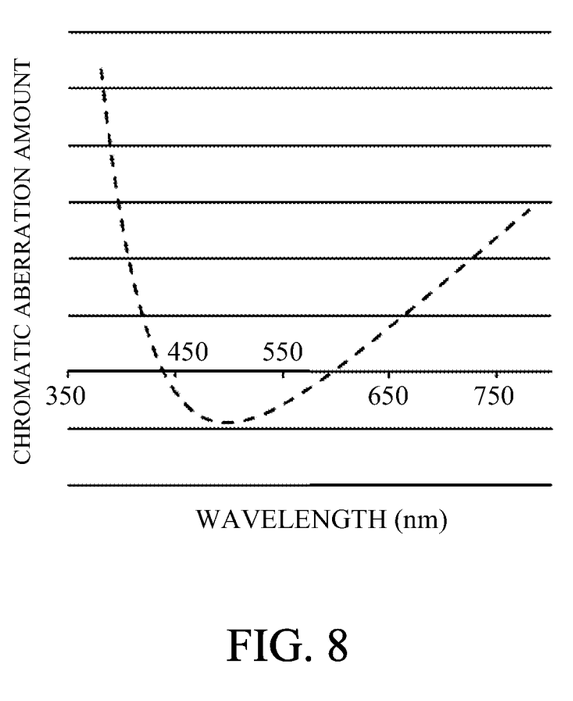
FIG. 8 is a diagram illustrating an amount of chromatic aberration generated in a typical image-taking optical system.

Description will be made of a method of deciding the sensitivity centroid of the IR pixel and the half-value wavelength of the IR-cutting filter 13. FIG. 8 illustrates a chromatic aberration amount generated in a typical image-taking optical system. A horizontal axis indicates a wavelength, and a vertical axis indicates the chromatic aberration amount when a d-line (wavelength 587.56 nm) of Fraunhofer lines is defined as a reference. In general digital cameras, their image-taking optical system is designed such that its chromatic aberration amount in the visible wavelength range becomes smallest. However, its chromatic aberration amount in the infrared wavelength range becomes large. This large chromatic aberration amount in the infrared wavelength range significantly affects the detection result of the focus detector 10. For this reason, using the infrared light contained in the light from the object enables correcting the focus detection result (defocus amount) with high accuracy.

Figure 6:
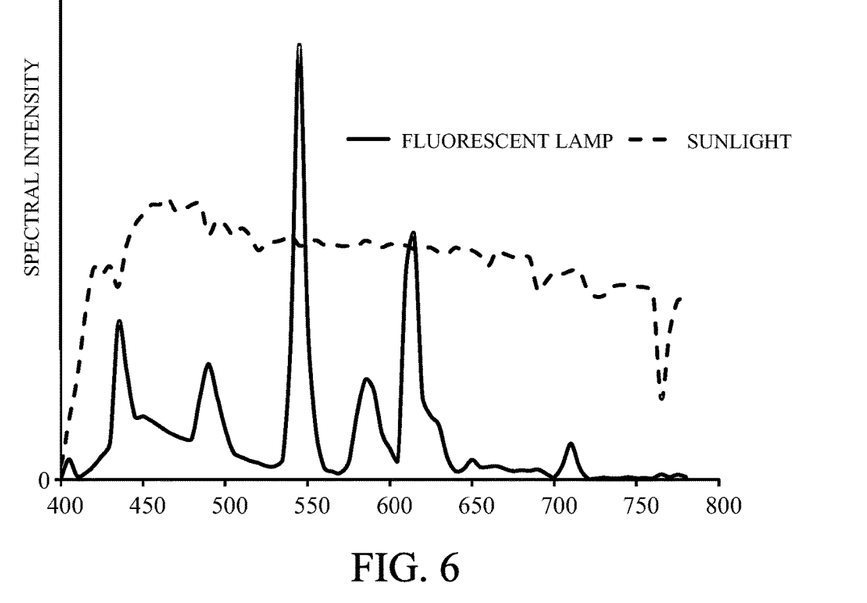
FIG. 6 is a diagram illustrating spectral intensities for respective light sources.

FIG. 6 illustrates a spectral sensitivity (spectral intensity) of a reflected light from a white object illuminated with a fluorescent lamp which is a light source containing almost no infrared light and a spectral sensitivity of a reflected light from the white object illuminated by sunlight which is a light source containing a large amount of infrared light. The light from the white object illuminated with the fluorescent lamp has almost no spectral intensity at a longer wavelength side than 680 nm. On the other hand, the light from the white object illuminated with the sunlight has a large spectral intensity at the longer wavelength side than 680 nm. For this reason, it is desirable that a wavelength of the sensitivity centroid of the IR pixel be a wavelength at the longer wavelength side than 680 nm.

Figure 7:
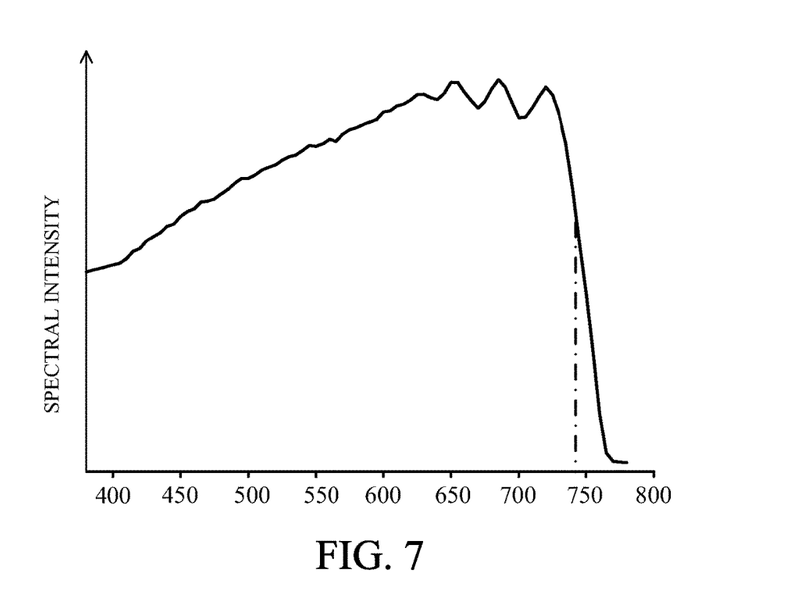
FIG. 7 is a diagram illustrating a spectral sensitivity characteristic of a focus detector in the image pickup apparatus.

FIG. 7 illustrates a spectral sensitivity of the line sensor provided to the focus detector 10. The line sensor has a spectral sensitivity so as to be able to capture lights from the visible wavelength range up to a near-infrared wavelength range, more specifically, up to an infrared light whose peak wavelength is around 700 nm; the line sensor therefore has an effective spectral sensitivity to a wavelength range up to approximately 740 nm. It is enough that the light source information from the photometric sensor 7 contains the spectral intensity of the infrared light in the spectral sensitivity wavelength range of the line sensor. It is thus desirable that the wavelength of the sensitivity centroid of the IR pixel be a wavelength at a shorter wavelength side than 740 nm.

For these reasons, it is desirable that the wavelength of the sensitivity centroid of the IR pixel be a wavelength longer than 680 nm and shorter than 740 nm, for example, be a wavelength around 690 nm as illustrated in FIG. 5. In addition, it is desirable that the half-value wavelength of the IR-cutting filter 13 be a wavelength longer than the wavelength of the sensitivity centroid of the IR pixel and equal to or shorter than 740 nm, for example, a wavelength around 720 nm as illustrated in FIG. 5.

However, it is necessary that the spectral sensitivity of the IR pixel and that of the R pixel whose sensitivity centroid is at a longest wavelength among the visible-light pixels be distinct from each other. If these spectral sensitivities are not distinct from each other, the visible light and the infrared light cannot be separated, which makes it impossible to accurately acquire the intensity of the infrared light with respect to that of the visible light, namely, the light source information. This makes it impossible to correct the focus detection result with high accuracy. For this reason, it is desirable to separate the wavelength of the sensitivity centroid of the R pixel and that of the IR pixel away from each other by 50 nm or more (that is, to make the wavelength of the sensitivity centroid of the R pixel shorter than that of the IR pixel by 50 nm or more). On the other hand, a difference of 150 nm or more between the wavelengths of the sensitivity centroids of the R and IR pixels makes it impossible to measure lights in a wavelength range between these wavelengths of the sensitivity centroids, so that accuracy in correcting the focus detection result decreases. Therefore, it is desirable to make the wavelength of the sensitivity centroid of the R pixel shorter than that of the IR pixel within a range from 50 nm or more to 150 nm or less.

With such setting, the camera controller 14 can perform the defocus amount correction (i.e., AF) by using the light source information containing the output of the IR pixels and using the object color information which uses a value obtained by subtracting the output of the IR pixels from that of the R pixels, namely, an intensity of the red light containing no infrared light.

In addition, a too-narrow half maximum full-width of the IR pixel decreases the output of the IR pixel and increases noise, which makes it impossible to acquire accurate light source information. Therefore, it is desirable to set the half maximum full-width of the IR pixel to 40 nm or more so as to provide a noise reduction effect. It is more desirable to set the half-vale wavelength width of the IR pixel to 50 nm or more since the setting can provide a more satisfactory noise reduction effect. On the other hand, since it is unnecessary to capture the infrared light in an excessively broad wavelength range by the IR pixel, it is desirable to set the half maximum full-width of the IR pixel to 70 nm or less.

The above-described setting of the sensitivity centroids of the IR and R pixels, the half-vale wavelength of the IR-cutting filter 13 and others enables an improvement of the accuracy in correcting the focus detection result, which makes it possible to perform a highly accurate AF irrespective of the type of the light source and the color of the object.

The image pickup apparatus described in this embodiment can detect, by using the multiple infrared receiving elements and visible-light receiving elements arranged in the single light-receiving sensor, both the type of the light source which illuminates the object located within the image-taking area and the color of the object with a good accuracy. Therefore, the apparatus can perform satisfactory focus control corresponding to the detection results of the type of the light source and the color of the object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224949, filed on Oct. 30, 2013, which is hereby incorporated by reference herein in its entirety.

What is claimed is:

1. An image pickup apparatus comprising:
a focus detector configured to produce, by using a light from an object passing through an image-taking optical system, focus information indicating a focus state of the image-taking optical system;
a light-receiving sensor including (a) three types of color visible-light receiving elements each receiving the light from the object and respectively having sensitivity centroids in mutually different wavelength ranges of a visible wavelength range and (b) a plurality of infrared receiving elements each having a sensitivity centroid in an infrared wavelength range, which are provided separately from each other, wherein the three types of color visible-light receiving elements and the plurality of infrared receiving elements are arranged two-dimensionally; and
a controller configured to:
perform focus control of the image-taking optical system by using the focus information, spectral information in accordance with outputs from the three types of color visible-light receiving elements, and light source information in accordance with an output from at least one of the three types of color visible-light receiving elements and outputs from the plurality of infrared receiving elements.

2. The image pickup apparatus according to claim 1 further comprising an infrared-cutting filter disposed on a light-entering side further than the light-receiving sensor, the infrared-cutting filter having a half-value wavelength longer than a wavelength of the sensitivity centroid of the infrared receiving elements, wherein:
the plurality of infrared receiving elements have the sensitivity centroid in a wavelength range longer than 680 nm and shorter than 740 nm, and
the infrared-cutting filter has the half-value wavelength in a wavelength range longer than the wavelength of the sensitivity centroid of the infrared receiving elements and equal to or shorter than 740 nm.

3. The image pickup apparatus according to claim 1, wherein the controller is configured to perform the focus control by using a value obtained by subtracting the output of the plurality of infrared receiving elements from output of a longest-wavelength color visible-light receiving element whose sensitivity centroid is at a longest wavelength side among the three types of color visible-light receiving elements.

4. The image pickup apparatus according to claim 1, wherein the wavelength of the sensitivity centroid of the longest-wavelength color visible-light receiving element is shorter than that of the plurality of infrared receiving elements by 50 nm or more.

5. The image pickup apparatus according to claim 1, wherein a half maximum full-width of the plurality of infrared receiving elements is 40 nm or more.

6. The image pickup apparatus according to claim 1, wherein the controller is configured to acquire chromatic aberration information of the image-taking optical system and to perform the focus control by using the chromatic aberration information.

7. The image pickup apparatus according to claim 1, wherein the controller is configured to perform focus control based at least on spectral information obtained from a spectral intensity ratio that is the ratio of outputs from the at least three color visible-light receiving elements.

8. The image pickup apparatus according to claim 1, wherein the controller is configured to obtain a spectral intensity ratio by subtracting an output from at least one of the plurality of infrared receiving elements from at least one of the outputs from the three types of color visible-light receiving elements.

9. The image pickup apparatus according to claim 1, wherein the controller is configured to calculate a defocus amount including the light source information and the spectral information, and perform the focus control of the image-taking optical system by using the focus information and the defocus amount.

10. The image pickup apparatus according to claim 9, wherein the controller is configured to calculate the defocus amount by using a calculated result obtained by substituting an output from the three types of color visible-light receiving elements and an output from at least one of the plurality of infrared receiving elements, into a function.

11. The image pickup apparatus according to claim 1, wherein the three types of color visible-light receiving elements respectively have sensitivity centroids in blue, green, and red wavelength ranges.

12. The image pickup apparatus according to claim 1, wherein the controller is configured to obtain the spectral information indicating a color of the object by using a spectral intensity ratio that is a ratio of outputs from the three types of color visible-light receiving elements, and the light source information on a light source illuminating the object by using an output from at least one of the three types of color visible-light receiving elements and an output from at least one of the plurality of infrared receiving elements, and perform the focus control of the image-taking optical system by using the focus information, the spectral information, and the light source information.

* * * * *